Figure 1:
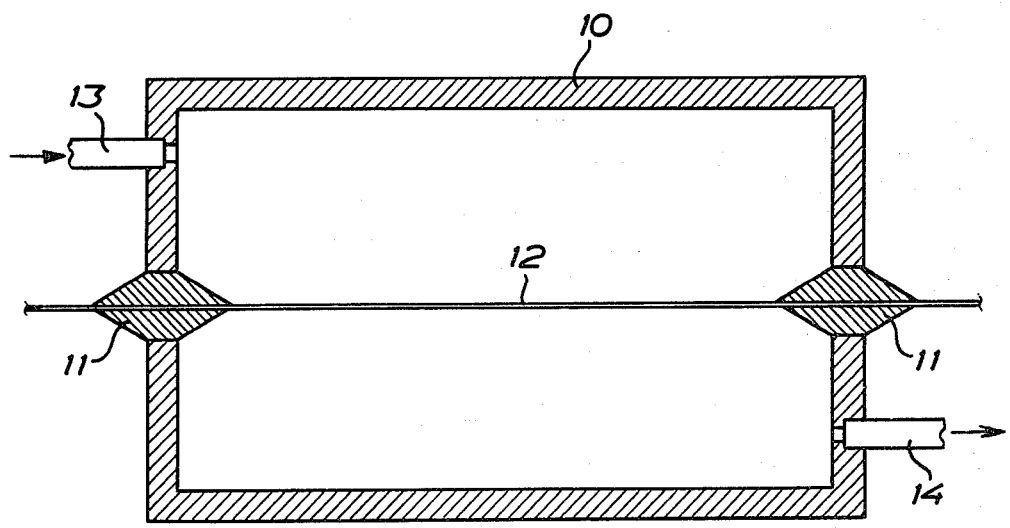

United States Patent [19]

Högberg

[11] 4,318,708
[45] Mar. 9, 1982

[54] METHOD OF INVESTIGATION OR CONTROL OF CATALYSTS OR CATALYST REACTIONS

[75] Inventor: Anders T. V. Högberg, Gothenburg, Sweden

[73] Assignee: AB Volvo, Gothenburg, Sweden

[21] Appl. No.: 158,075

[22] Filed: Jun. 10, 1980

Related U.S. Application Data

[63] Continuation of Ser. No. 47,711, Apr. 23, 1979, abandoned, which matured from PCT No. PCT/SE78/00034, filed Aug. 22, 1978, 102(e) date Apr. 23, 1979, abandoned.

[30] Foreign Application Priority Data

Aug. 23, 1977 [SE] Sweden ................................. 7709446

[51] Int. Cl.³ ....................... G05D 21/02; F01N 3/15; B01D 53/34
[52] U.S. Cl. .......................... 23/230 R; 23/230 PC; 23/232 E; 204/164; 204/170; 204/179; 250/324; 422/98; 423/212
[58] Field of Search .......... 23/230 R, 230 PC, 232 C, 23/232 E; 422/94, 98; 250/324, 283; 204/164, 165, 170, 179; 423/212

[56] References Cited

U.S. PATENT DOCUMENTS

| | | | |
|---|---|---|---|
| T950,006 | 9/1976 | Leibowitz | 423/212 X |
| 3,321,391 | 5/1967 | Warfield et al. | 204/165 |
| 3,755,120 | 8/1973 | Kinser | 204/165 X |
| 3,832,848 | 9/1974 | Scholl | 423/212 X |
| 3,925,023 | 12/1975 | Kaiser | 422/54 |
| 3,926,558 | 12/1975 | Davis | 23/230 R |

FOREIGN PATENT DOCUMENTS 51-133174 11/1976 Japan.
52-21273 2/1977 Japan.
52-69864 6/1977 Japan.

Primary Examiner—Michael S. Marcus
Attorney, Agent, or Firm—Finnegan, Henderson, Farabow, Garrett & Dunner

[57] ABSTRACT

A method of investigation or control of catalysts or catalyst reactions wherein a gas or gas mixture is brought into contact with the catalyst (12). The properties of the catalyst and/or the progress of the reaction depending on the catalyst are determined or controlled by applying an electric field between the catalyst (12) and an electrode (10) which is arranged in the gas atmosphere spaced from the catalyst.

The size of a corona current thereby produced between the catalyst and the electrode is measured and/or adjusted.

3 Claims, 10 Drawing Figures

METHOD OF INVESTIGATION OR CONTROL OF CATALYSTS OR CATALYST REACTIONS

This is a continuation, of application Ser. No. 047,711, filed Apr. 23, 1979 now abandoned, which matured from PCT No. PCT/SE78/00034, filed Aug. 22, 1978, 102(e) dated Apr. 23, 1979 abandoned.

In heat engines operating with external as well as internal combustion, the combustion rate and the combustion selectivity, i.e. the control of the combustion, are of critical importance as far as efficiency and environment are concerned. The problems created and the squandering taking place at the combustion in internal combustion engines are well-known as well as the efforts to solve these problems by using external combustion engines (the Stirling engine) or fuel cells. In ovens of different types in connection with manufacturing processes analogous problems arise. This may be illustrated by combustion for heating and burning evaporated solvents. Therefore, knowledge of the combustion process under practical conditions is of importance so that the process can be influenced and temperature and exhaust gases can be held under control, the economy at the same time being acceptable.

As catalysts for gas reactions solid substances such as metals, oxides, sulphides, etc. often are preferred. One then speaks about heterogenous catalysis. For a long time and after extensive investigations it is known that for a certain reaction only certain materials are effective. It has also been observed that only certain portions of the catalyst are active. Therefore, one has often tried to produce catalysts by affecting and enlarging the surface. However, it has turned out that quite other properties than the specific appearance of the surface also are effective. These other properties present themselves very clearly when poisoning and selectivity of a catalyst are studied. At catalysis it is also spoken of geometrical factors (enlargement of the surface, disturbances in the atomic lattice, etc.) as well as the "chemical affinity" between reacting substances and catalyst.

The influence of the catalyst on the reaction rate is dependent i.a. on the fact that the catalyst transfers the reacting substances into more active conditions. These conditions arise by chemisorption on the surface of the catalyst, e.g. by reaction between a hydrogen atom in the substance to be oxidized and electrons from the catalyst. In this reaction electrons in gas and catalyst participate and often an ionization of the gas which is adsorbed on the surface takes place. By this process a condition which is thermodynamically more advantageous to the reaction (or in any case is changed) is obtained.

For an advantageous result certain conditions now are raised as far as the catalyst is concerned. The catalyst shall chemisorb actual reaction partners, but the adsorption must not be so strong that reactions are prevented (poisoning). Certain sterical factors must be present so that gas molecules and residues can react. The final products must easily desorb from the surface. Possible side reactions (not desired) must be small.

The invention relates to a method for determining or controlling the properties of a catalyst or the progress of the reaction depending on the catalyst, wherein a gas or gas mixture is brought into contact with the catalyst, said method having the characteristics appearing from claim 1.

Figure 2:
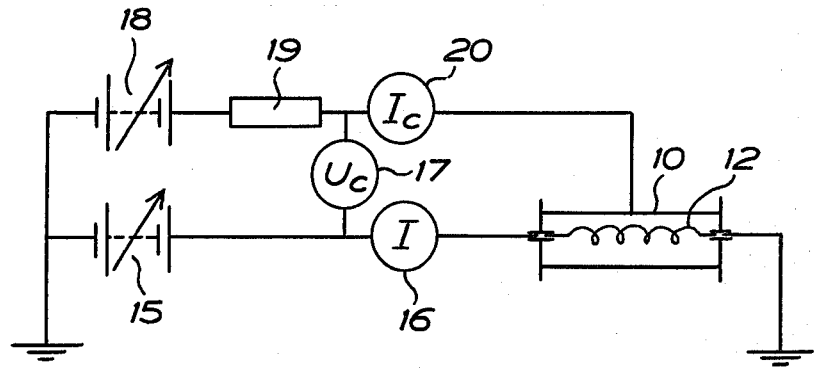
Figure 3:
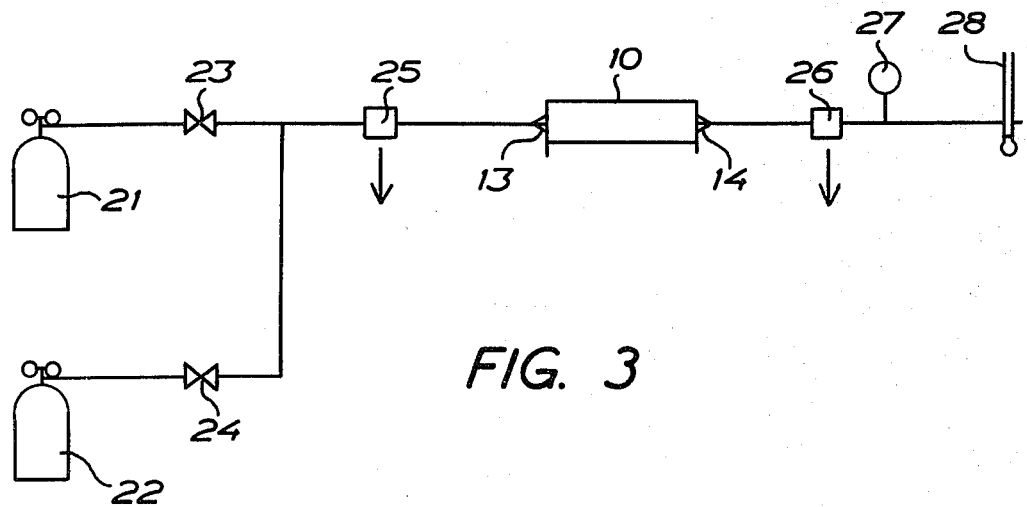
Figure 6:
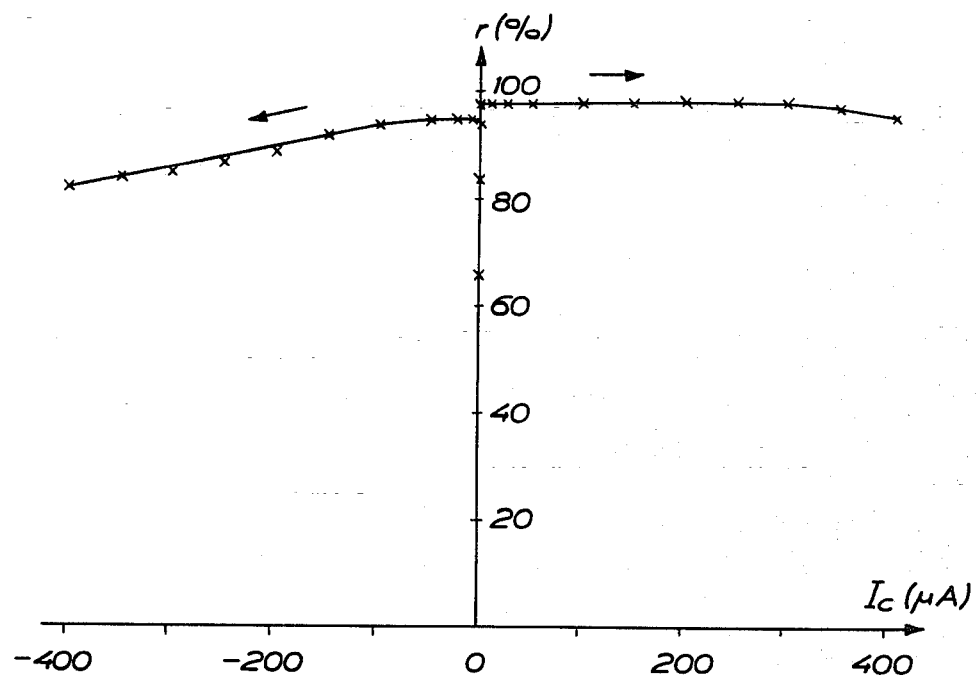
Figure 7:
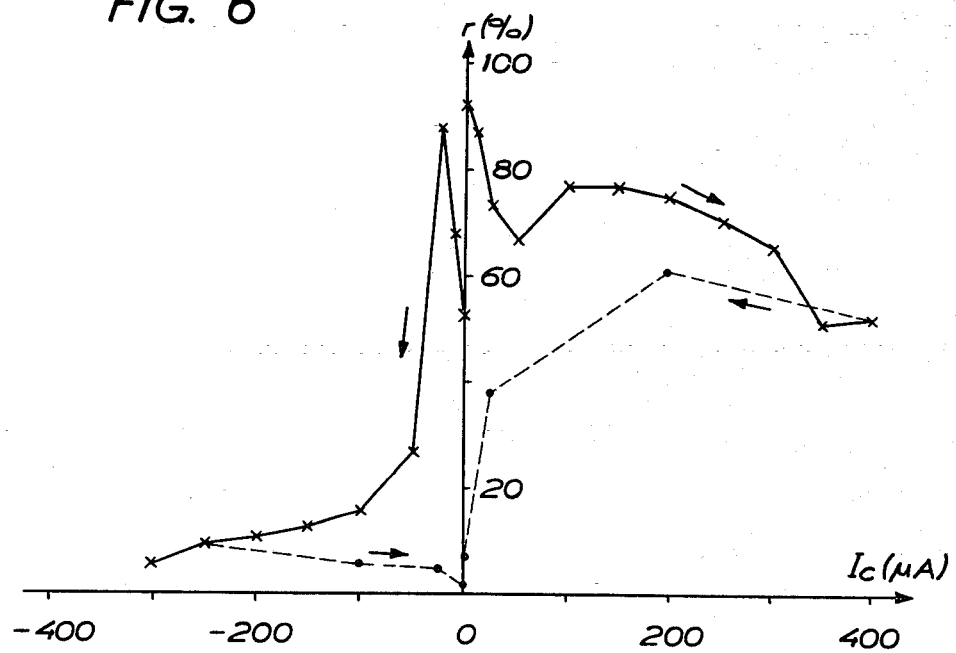
Figure 8:
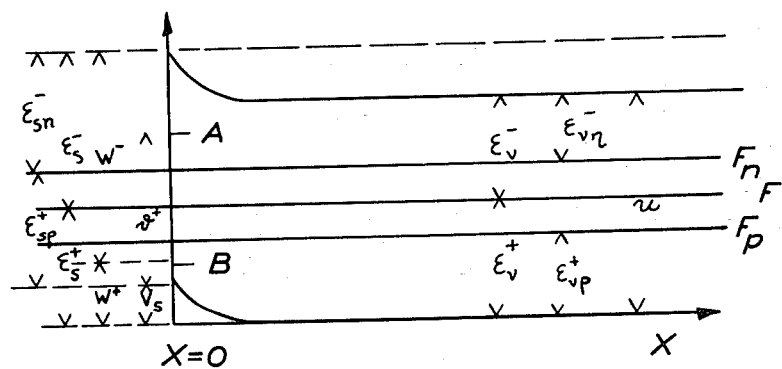
Figure 9:
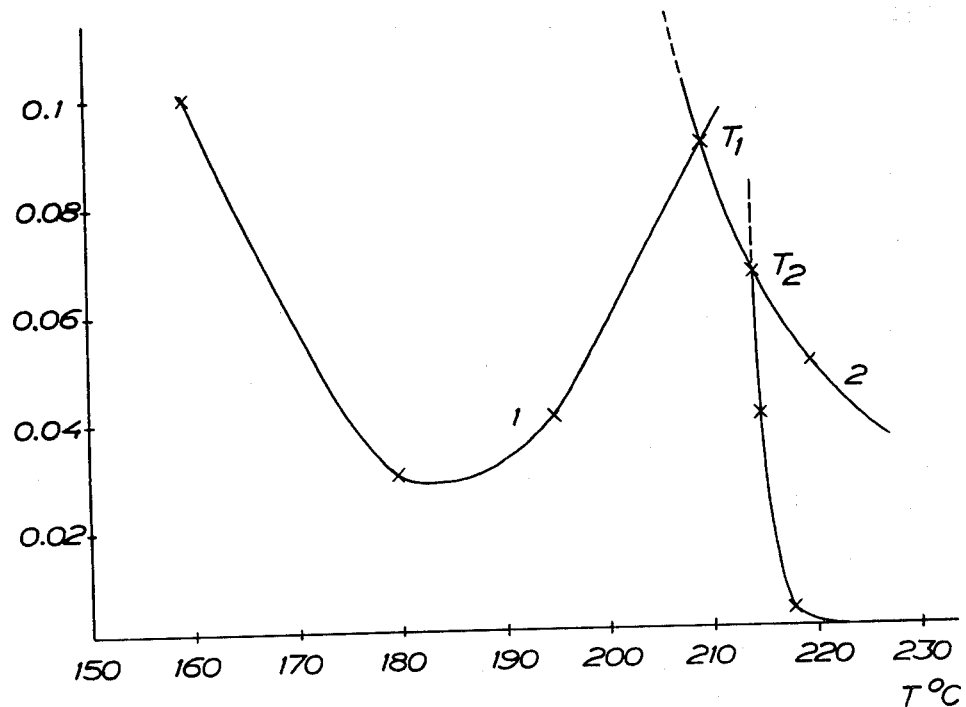
Figure 10:
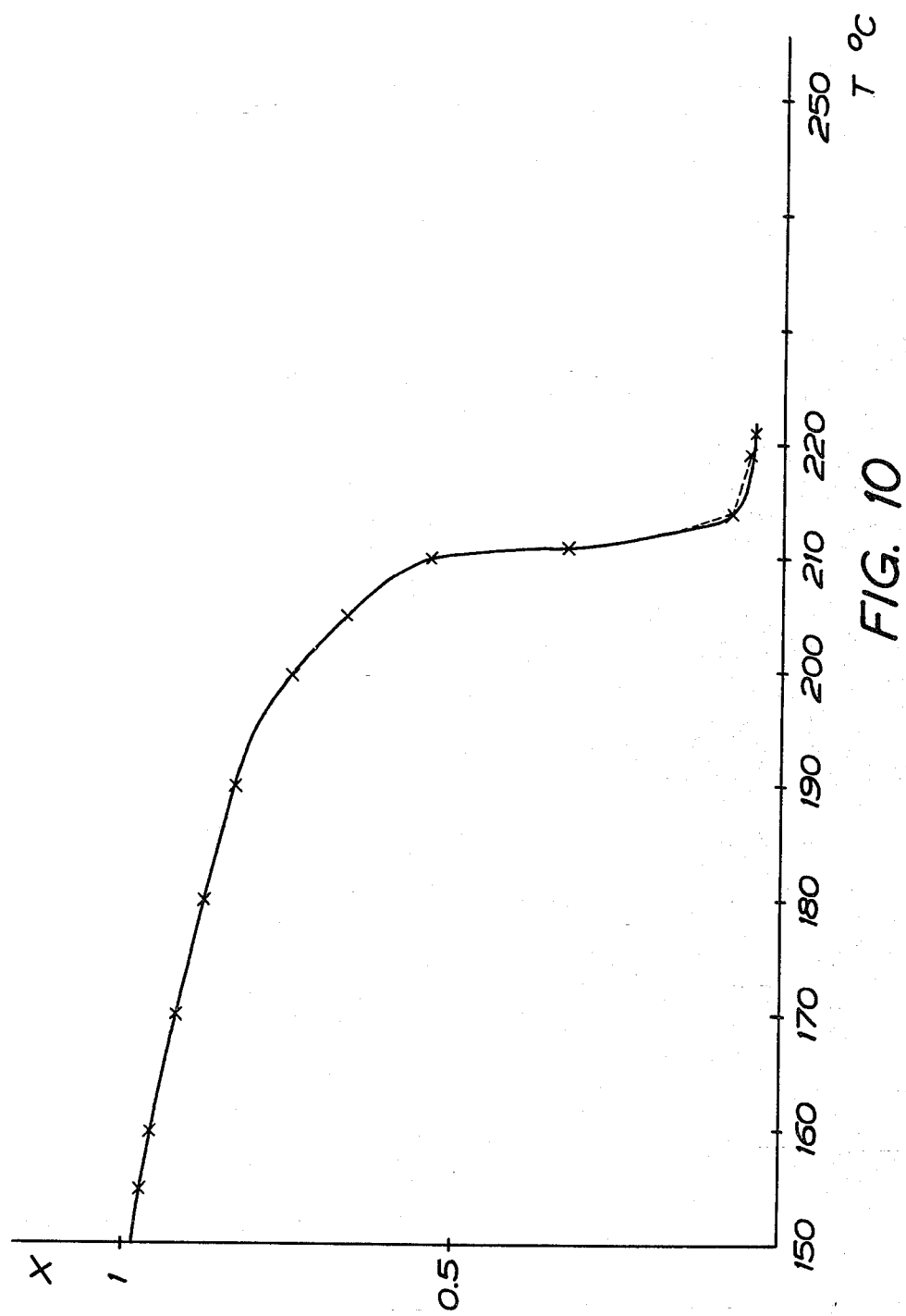

In order to elucidate the method according to the invention this method will be illustrated with reference to the accompanying drawings in which FIG. 1 is a longitudinal sectional view of a reaction chamber in a test apparatus for working the method, FIG. 2 is an electrical connection diagram for heating the catalyst and measuring occurring corona current and temperature changes of the catalyst, FIG. 3 is a gas flow diagram for the combustion of hydrogen and air in the reaction chamber, FIGS. 4 to 7 are diagrams illustrating the influences of the corona current on the catalytic reaction in the reaction chamber under different conditions, FIG. 8 illustrates symbols in connection with the explanation of a thermal model for heterogenous catalytic reaction, FIG. 9 is a diagram illustrating a critical function in oxidation of CO, and FIG. 10 is a diagram of the CO concentration as a function of the temperature.

In FIG. 1 there is shown a cylindrical reaction chamber 10 of brass having electrically insulating bushes 11 of porcelain for leading through a platinum wire 12 used as a catalyst, which extends axially through the chamber. A gas inlet 13 and a gas outlet 14 are connected to the chamber at opposite ends thereof.

According to the connection diagram in FIG. 2, a voltage source 15 of low voltage 0-48 V is connected to the wire 12 in series with an ammeter 16, and a voltmeter 17 for measuring corona characteristic is connected over the wire. Between the chamber wall and the wire there is connected a high-voltage source 18 of 0-30 kV in series with a high-resistance protective resistor 19 and a microammeter 20.

As shown in FIG. 3, two containers 21 and 22 for pressurized hydrogen and air are connected to the gas inlet 13 through valves 23 and 24, an outlet 25 to a gas chromatograph being provided in the connection member. An outlet 26 to a gas chromatograph, a pressure gauge 27 and a flow rate meter 28 are connected to the gas outlet 14 said gas outlet communicating with the surrounding atmosphere from the flow rate meter.

By using the apparatus described above the influence of corona current on a catalytic reaction by means of a platinum wire as catalyst has been investigated under different conditions. The results of these investigations are presented by the diagrams in FIGS. 4 to 7.

In the diagrams the abscissa indicates the corona current $I_c$ in microampere, this current as measured by means of the microammeter 20 being considered as negative when the wire 12 is negative in relation to the wall of the chamber 10, and being considered as positive when the wire is positive in relation to the wall of the chamber. The ordinate indicates the reaction ratio r, i.e. the concentration of hydrogen in the gas outlet 14 in relation to the concentration of hydrogen in the gas outlet 13. In all cases a mixture of four percent hydrogen by volume and the residue air has been supplied to the chamber 10, and before the test the platinum wire 12 has been conditioned in an oxygen atmosphere for 5 min at 400° C. The diagrams in FIGS. 4 to 6 relate to tests with a platinum wire having the diameter 0.5 mm while the diagram in FIG. 7 relates to tests with a platinum wire having the diameter 0.05 mm.

Figure 4:
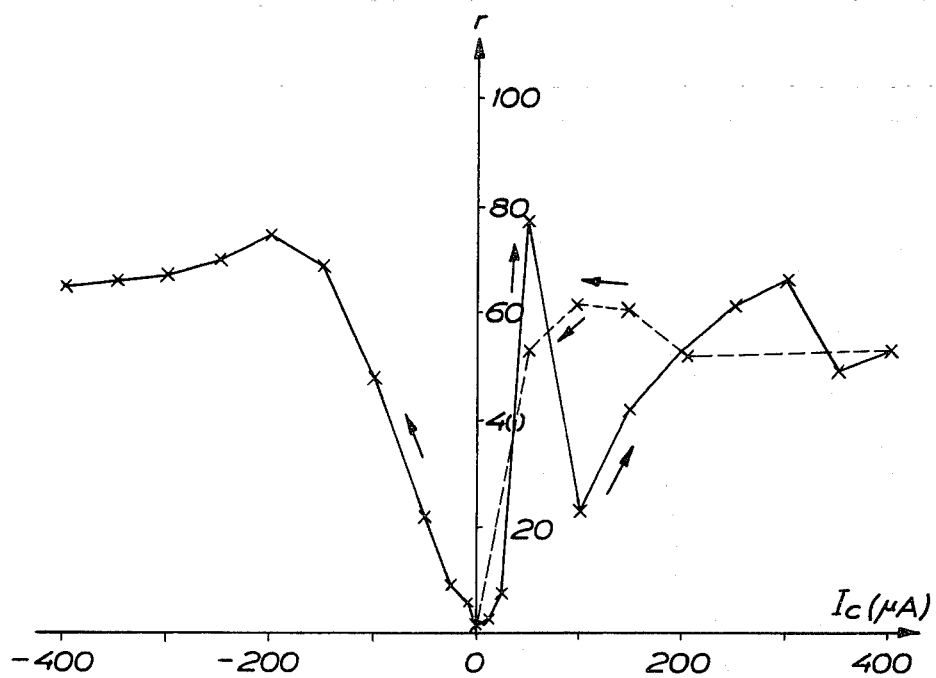

At the test according to the diagram in FIG. 4 the gas had a temperature as measured in the gas inlet 13 of 110°

C. and the wall of the chamber 10 was maintained at a temperature of 90° C. The solid line to the right of the ordinate connects the measuring points obtained when the corona current was increased from 0 to 400 μA by adjusting the voltage between the wire and the chamber wall said voltage being measured by means of the voltmeter 17 and constituting the corona current which can be designated $U_c$. The dash line connects the measuring points obtained when the corona current was again reduced from 400 μA to 0 μA, and it is thus of interest to observe that another characteristic will be obtained when the current is decreased than when it is increased (hysteresis effect).

To the left of the ordinate the solid line connects the measuring points obtained when the negative corona current was changed from 0 to −400 μA.

Figure 5:
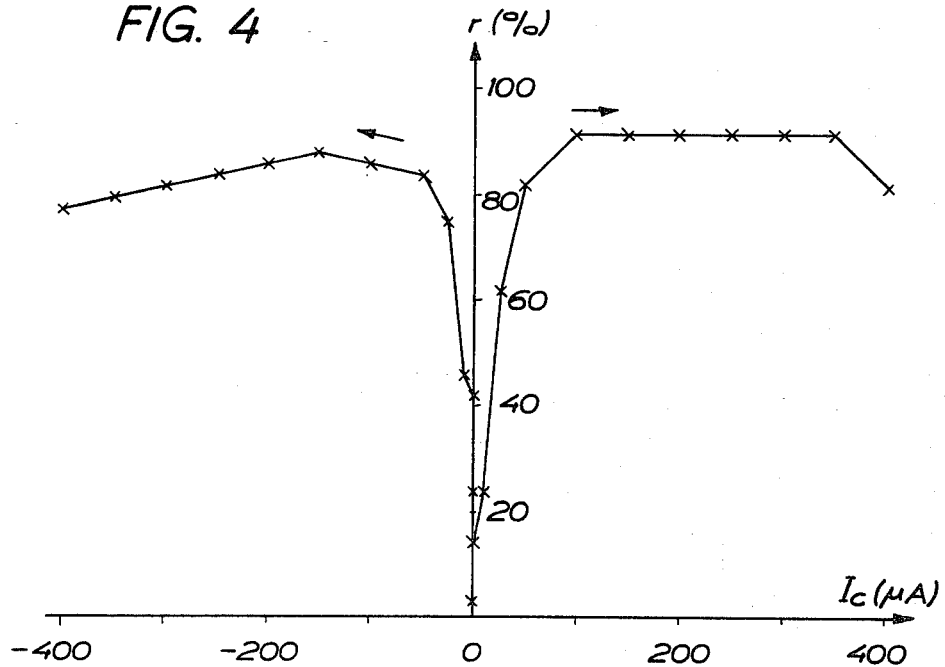

When the gas had an inlet temperature of 94° C. and the wall a temperature of 77° C. there was obtained instead the diagram according to FIG. 5 when the corona current was increased from 0 to 400 μA and from 0 to −400 μA, respectively, and the diagram according to FIG. 6 illustrates corresponding conditions in the case wherein the gas had an inlet temperature of 55° C. and the wall had a temperature of 48° C.

The diagram in FIG. 7 is a diagram corresponding to that in FIG. 4, i.e. to the right and to the left of the ordinate the solid lines connect the measuring points obtained when the corona current was increased from 0 to 400 and −300 μA, respectively, while the dash lines connect the measuring points obtained when returning to 0. In this case the wire 12 had a diameter of 0.05 mm as mentioned above. The gas had an inlet temperature of 200° C. and the wall a temperature of 165° C.

It will thus be seen that there are great possibilities to influence the effect of the catalyst, in this case the platinum wire 12, on the oxidation of the hydrogen supplied to the reaction chamber, by controlling the corona current, and this influence can take place within wide limits. This means that there is the possibility to control hereby catalytic processes and to separate catalytic processes. The process can be started or stopped by imparting to the corona current a predetermined value, and if more than one process can take place at the prevailing conditions there is the possibility to give preference to the desired process by adjusting the corona current to a predetermined value.

Only a catalyst in the form of a platinum wire has been dealt with above but it can be presumed that the same conditions prevail as far as catalysts of other materials are concerned. Moreover, it is perfectly clear that other catalytic processes than oxidation of hydrogen as chosen herein as an example can be controlled in a corresponding manner.

It is not necessary that the catalyst is located in the reaction chamber (combustion space); it can also be located in a conduit through which a gaseous fuel (petrol and air; hydrogen and water) is supplied to the reaction chamber.

The corona current density obviously affects the change of the catalytic effect which is obtained when the corona current is being changed because a greater current density as obtained with a thinner wire gives a greater ion bombardment against the surface of the catalyst. Then there is obtained a greater field change at the surface and a more significant influence of the corona current.

The theoretical considerations forming the basis of the invention will be explained in more detail below.

The rate of heterogenous catalytic reactions is controlled by parameters such as temperature, transport coefficients, pressure and external radiation at given kinetics. Generally, great difficulties are involved in determining transport coefficients such as mass transport numbers at the catalytic surface or "effective" reaction times in an over-dimensioned reactor. Therefore, a suitable way can be to eliminate these parameters difficult to determine and to use e.g. temperature and/or radiation as control means.

In the following it is assumed that we have a flow system. The chemical reactor principally can have an arbitrary form. It is presupposed that we have possibilities of measuring partial pressures or concentrations of a time-determining chemical composition, e.g. by a specially constructed mass spectrometer or laser. The measuring instruments indicate continuously in an arbitrary point outside the reacting surface. They have a time resolving power which is as high as is necessary and they measure at the actual reaction pressure. At the same time the temperature in the actual point and the temperature (possibly the average temperature) at the reacting surface are measured.

On the basis of the kinetic relationships and by the introduction of concentrations and temperature derivators of concentrations instead of transport coefficients there is obtained a system which is determined by the quantities concentration in the gas phase, temperature and radiation, said quantities being easy of access. By external control of temperature and/or radiation the reaction rate of given products at the surface can be controlled and selectively influenced. Actual critical conditions can be controlled, i.e. ignition and spontaneous reactions, respectively, can be avoided or aimed at.

It is presupposed that the thermal condition for a surface at which a heterogenous exothermic gas reaction takes place can be described by the following non-stationary equations (Diffusion and heat transfer in chemical kinetics, David A. Frank Kamenetsku. Plenum Press 1969).

$$\frac{dc'}{dt} = \beta_1(c - c') - g \qquad (1)$$

$$C_p \rho \frac{dT}{dt} = Qg - \alpha(T - T_o) \qquad (2)$$

Here $c'$ and $c$ are the concentrations of a rate determining component at the surface and in the gas volume, respectively. T is the surface temperature and $T_o$ is the ambient temperature. g is the reaction rate at the surface. Q is reaction heat set free. $\alpha$ is the heat transport and $\beta_1$ is the mass transport coefficient.

Initially, oscillating processes are disregarded and instabilities and quasi-stationary conditions are investigated. Then, the temperature equation can be written $$C_p \rho \frac{dT}{dt} = q(T) - q'(T) \qquad (3)$$

wherein substitution has been made from equation (1) into equation (2). Also other instabilities can of course be investigated for the physical situation dealt with herein. Methods for the instability investigation are given in Diffusion and heat transfer in chemical kinetics mentioned above. The instability criteria can now be written $$\frac{dq}{dT} > \frac{dq'}{dT} \tag{4}$$

The condition of "ignition" or "extinction" can be written $$\frac{dq}{dT} = \frac{dq'}{dT} \tag{5}$$

or from (2) and (5)

$$Q\frac{dq}{dT} = \alpha \tag{6}$$

Equation (6) is solved together with (1) for quasi-stationary conditions and the condition $$b(c_o-c)=\beta(c-c')=g \tag{7}$$

is obtained wherein $c_o$ is the concentration of gas in the inlet and b is an inverted flow rate.

The model of heterogenous catalytic reaction shall now be studied.

1. Transport model

In order to explain method and principles we choose the simplest conceivable model. Let it be assumed that the surface reaction is of the first order and that the reaction rate at the surface accordingly can be written in the form $g=kc'$ wherein k is the temperature-dependent rate constant. Then there is obtained for the reaction rate defined in rate constant and mass transfer number $$g = \frac{\beta k}{\beta + k} c_o \text{ with } \beta = \frac{b\beta}{b + \beta_1} \tag{8}$$

$\beta$ changes slowly with the temperature compared to k.

2. Electro-model

We shall describe briefly herein the portions of the formalism which are valid for irradiated semi-conductor catalysts and which we need for the critical equations. A more complete and physical description will be given in another connection.

Every chemical gas process catalysed by a surface comprises studies of absorption and desorption as initial and end states. The gas molecules are adsorbed at the surface and can then either react at the surface or with a molecule in the gas phase. The product is then desorbed. At catalysis there is made a distinction between chemisorption and physisorption. Generally, it is the chemisorption that is relevant to catalysis. It involves a closer binding to the surface.

Let it now be assumed that we have particles of a certain kind which have been chemisorbed at a surface. Let N be the number of particles per surface unit and let it be assumed that $N^\circ$, $N^-$, $N^+$ particles are electrically neutral, negatively charged and positively charged, respectively.

Apparently we have $$N^\circ + N^- + N^+ = N \tag{9}$$

Quantities $$\eta_o = \frac{N_o}{N} \; ; \; \eta^- = \frac{N^-}{N} \; ; \; \eta^+ = \frac{N^+}{N} \tag{10}$$

characterize the relative contents of the chemisorption at the surface. Then the following relationship applies $$\eta^\circ + \eta^- + \eta^+ = 1 \tag{11}$$

If we have electron equilibrium at the surface, the parameters $\eta^\circ$, $\eta^-$ and $\eta^+$ are fixed. The values thereof are determined by the position of the Fermi level at the surface. Let $\epsilon_s^-$ and $\epsilon_s^+$ designate the distance from the Fermi level to the bottom of the conductivity band and to the top of the valence band, respectively.

Then $$\epsilon_s^- + \epsilon_s^+ = \mu \tag{12}$$

wherein u is the width between the regions.

It can be shown that according to the Fermi statistics $$\frac{N^-}{N^\circ + N^-} = \left(1 + \exp\frac{\epsilon_s^- - v^-}{kT}\right)^{-1} \tag{13}$$

$$\frac{N^+}{N^\circ + N^+} = \left(1 + \exp\frac{\epsilon_s^+ - w^+}{kT}\right)^{-1}$$

wherein k is the Bolzmann constant, T is the absolute temperature, $v^-$ is the distance from the acceptor level, representing the particle, to the bottom of the conductivity band, and $w^+$ is the distance from the donor level, representing the particle, to the top of the valence band.

By means of (13) and (10) the relationships sought are obtained $$\eta^\circ = \{1 + \exp[-(\epsilon_s^- - v^-)/kT] + \exp[-(\epsilon_s^+ - w^+)/kT]\}^{-1} \tag{14}$$

$\eta^- = \eta_o \exp[-(\epsilon_s^- - v^-)/kT]$ $\eta^+ = \eta_o \exp[-(\epsilon_s^+ - w^+)/kT]$ Here are $v^- + v^+ = w^- + w^+ = u$ The quantities $\eta^\circ$, $\eta^+$ and $\eta^-$ describe the relative number of particles having different charges as a function of the Fermi level.

The catalytic activity for a given reaction is characterized by the rte g which in turn can be expressed in the quantities $\eta^\circ$, $\eta^-$, $\eta^+$. Specific examples will be discussed later.

A crystal which is irradiated with ionizing radiation changes the surface population of electron levels and holes thereof as far as chemisorbed particles are concerned; hereby $\eta^\circ$, $\eta^-$ and $\eta^+$ are changed.

By establishing the conditions for electron equilibrium for the irradiated and non-irradiated surface it is possible to find the relations for the quantities $\eta$ between the two cases. Then $$\frac{\eta^\circ}{\eta_o^\circ} = [1 + \eta_o^-(\mu^- - 1) + \eta_o^+(\mu^+ - 1)] \tag{15}$$

$$\frac{\eta^-}{\eta_o^-} = \frac{\eta^\circ}{\eta_o^\circ} \mu^-$$

$$\frac{\eta^+}{\eta_o^+} = \frac{\eta^\circ}{\eta_o^\circ} \mu^+$$

Here are

-continued $$\mu^- = \frac{1 + \alpha^- + \frac{\Delta n_s}{n_{so}}}{1 + \alpha^- + \alpha^- \frac{\Delta p_s}{p_{so}}} = \frac{1 + \frac{1}{1+\alpha^-} \frac{\Delta n_s}{n_{so}}}{1 + \frac{1}{1+\alpha^-} \frac{\Delta p_s}{p_{so}}}$$

$$\mu^+ = \frac{1 + \alpha^+ + \frac{\Delta p_s}{p_{so}}}{1 + \alpha^+ + \alpha^+ \frac{\Delta n_s}{n_{so}}} = \frac{1 + \frac{1}{1+\alpha^+} \frac{\Delta p_s}{p_{so}}}{1 + \frac{1}{1+\alpha^+} \frac{\Delta p_s}{n_{so}}}$$

with $\alpha^- = \frac{\beta_1^-}{\beta_2^-} \exp \frac{\epsilon_s^- - v^+}{KT}$ $\alpha^+ = \frac{\beta_1^+}{\beta_3^+} \exp \frac{\epsilon_s^+ - w^-}{KT}$ $\beta_1^\pm$ are constants.

$\Delta n_s = n_s - n_{so}$ and $\Delta p_s = p_s - p_{so}$ represent the additions of free electrons and holes in the surface due to the irradiation.

In order to obtain sufficiently explicit and reasonable expressions we now introduce the simplified presupposition that we have a high excitation. Then $$\frac{\Delta n_s}{n_{so}} \gg 1, \alpha^-, \frac{1}{\alpha^+} ; \frac{\Delta p_s}{p_{so}} \gg 1, \alpha^+, \frac{1}{\alpha^-} \quad (16)$$

Then it is obtained $$\mu^- = \frac{\Delta n_s/n_{so}}{\alpha^- \Delta p_s/p_{sp}} ; \mu^+ = \frac{\Delta p_s/p_{so}}{\alpha^+ \Delta n_s/n_{so}} \quad (17)$$

If we assume that electron gas and hole gas are non-degenerated we can write $$n_{so} = C_n e^{-\frac{\epsilon_s^-}{kT}} ; p_{so} = C_p e^{-\frac{\epsilon_s^+}{kT}} \quad (18)$$

and $$n_s = C_n e^{-\frac{\epsilon_{sn}^-}{kT}} \quad p_s = C_p e^{-\frac{\epsilon_{sp}^+}{kT}}$$

$c_n$ and $c_p$ are of no interest to us in this connection. Other symbols will be seen from FIG. 8.

FF is the Fermi level at thermodynamic equilibrium. $F_n$ and $F_pF_p$ are "quasi" Fermi levels in the presence of irradiation for electrons and holes, respectively, $V_s$ designates the band bending adjacent to the surface (positive in the indicated direction).

Assume at a first approach that the "quasi" Fermi levels for electrons and holes remain constant throughout the crystal. ($F_nF_n$ and $F_pF_p$ are horizontal.) Approximately, it can be assumed that $$\epsilon_{sn}^- = \epsilon_{vn}^- + V_s; e_{sp}^+ = e_{vp}^+ - V_s \quad (19)$$

If we define $V_{so}$ as the band bending in the absence of irradiation we also obtain $$\epsilon_s^- = \epsilon_s^- + V_{so}; \epsilon_s^+ = e_v^+ - V_{so} \quad (20)$$

In the continued calculations we make the presupposition that $$\Delta V_s = V_s - V_{sp} \ll kT \quad (21)$$

which means that the band bendings due to irradiation are small.

By substitution from the foregoing it is obtained $$n_{so} = C_n \exp\left[-\frac{\epsilon_v^- + V_s}{kT}\right] = n_{vo} \exp\left(-\frac{V_s}{kT}\right) \quad (22)$$

$$p_{so} = C_p \exp\left[-\frac{\epsilon_v^+ + V_s}{kT}\right] = p_{vo} \exp\left(\frac{V_s}{kT}\right)$$

and $$n_s = C_n \exp\left[-\frac{\epsilon_{vn}^- + V_s}{kT}\right] = n_v \exp\left(-\frac{V_s}{kT}\right) \quad (23)$$

$$p_s = C_p \exp\left[-\frac{\epsilon_{vp}^- - V_s}{kT}\right] = p_v \exp\left(\frac{V_s}{kT}\right)$$

$n_{vo}$ and $P_{vo}$ as well as $n_v$ and $P_v$ are concentrations of charge carriers in the absence and presence, respectively, of irradiation.

By using (22) and (23) together with the definition of the additions of free charge carriers $$\Delta n_s = n_s - n_{so} \quad \Delta p_s = p_s - p_{so}$$

due to the irradiation it is obtained $$\Delta n_s = \Delta n_v \exp\left(-\frac{V_s}{kT}\right), \Delta p_s = \Delta p_s = \Delta p_v \exp\frac{V_s}{kT} \quad (24)$$

where we have introduced $$\Delta n_v = n_v - n_{vo}; \Delta p_v = p_v - p_{vo} \quad (25)$$

We assume that the electron neutrality is maintained inside the crystal, i.e. that $\Delta n_v = \Delta p_v$.

For convenience we assume that $C_n = C_p$ although this is not necessary. By using the definitions of $\alpha^-$ and $\alpha^+$ as well as $\mu^-$ and $\mu^+$ from the foregoing we obtain if the values of $\Delta n_s$ and $\Delta p_s$ obtained above are substituted in (17)

$$\mu^- = \exp\left[\frac{(\epsilon_v^- - V_s - v^-)}{kT}\right] \quad (26)$$

$$\mu^+ = \exp\left[\frac{(\epsilon_v^+ + V_s - w^+)}{kT}\right]$$

Since $$V_s = \epsilon_s^- - \epsilon_v^- = e_v^+ - \epsilon_s^+ \quad (27)$$

according to FIG. 1 we can write $$\mu^- = \exp\left[\frac{2\epsilon_v^- - \epsilon_s^- - v^-}{kT}\right] = \quad (28a)$$

$$\exp\left[-\frac{2\epsilon_v^+ - \epsilon_s^+ - v^+}{kT}\right]$$

-continued
and $$\mu^+ = \exp\left[\frac{(2\epsilon_v^+ - \epsilon_s^+ - w^+)}{kT}\right] = \exp\left[-\frac{(2\epsilon_v^- - \epsilon_s^- - w^-)}{kT}\right] \quad (28b)$$

Generally, $\epsilon_s^-(\epsilon_s^+)$ is a function of $\epsilon_v^-(\epsilon_v^+)$. In the cases wherein we have no functional dependence it is spoken of quasi-insulated surfaces. They appear when the population density at the surface is sufficiently high. By substitution in (15) and using (28) it is obtained $$\frac{\eta^-}{\eta^o} = \exp\left(-\frac{2V_s}{kT}\right) \quad (29)$$

$$\frac{\eta^+}{\eta^o} = \exp\frac{2V_s}{kT}$$

If we moreover use the normalizing condition for $\eta$ it is obtained $$\eta^o = \frac{1}{1 + 2\cosh\frac{2V_s}{kT}} \quad (30)$$

$$\eta^- = \frac{\exp - \frac{2V_s}{kT}}{1 + 2\cosh\frac{2V_s}{kT}}$$

$$\eta^+ = \frac{\exp\frac{2V_s}{kT}}{1 + 2\cosh\frac{2V_s}{kT}}$$

Since $n^\circ$, $n^-$ and $n^+$ characterize the reactions at the surface and these in turn are dependent on $V_s$, we see that the band bending due to the irradiation determines the surface reactions in our approach.

In order to use (30) in catalytic connections we use as a base a reaction-kinetic model wherein $\eta$ is introduced. In the following we shall study such a model in connection with oxidation of carbon monoxide.

It is suitable to characterize the reaction under the influence of ionizing radiation with the relative change of the rate constant thereof.

$$R = \frac{k - k_o}{k_o} \quad (31)$$

Here k and $k_o$ are the rate constants with and without radiation, respectively. According to (4) and (5), the criticality conditions are determined by g and the temperature derivatives of g. We therefore form $$\frac{dk}{dT} = k_o\frac{dR}{dT} + (R + 1)\frac{dk_o}{dT} \quad (32)$$

If R is determined, the influence of the radiation on the stability conditions can be obtained. In the following we shall study the kinetics on the basis of expressions of R which have been derived from the electron properties of the semi-conductor. We shall also show how the critical conditions can be related to or controlled by the radiation.

3. Kinetic model

As a demonstration and application we shall now study oxidation of carbon monoxide according to the heterogenous reaction $$2CO + O_2 \rightarrow 2CO_2$$

This reaction has been studied to a great extent as shown by several references in the literature. The reaction can proceed according to different mechanisms depending on the reaction conditions. We choose a reaction which has been given in "Elektronentheorie der Katalyse an Halbleitern", Wolkenstein Th - VEB Deutscher Verlag der Wissenschaften, Berlin, 1964. The following presuppositions have been made: The catalyst surface contains chemisorbed oxygen atoms which are in an ion-radical condition. The oxygen atoms comprise adsorption centra for CO molecules. The surface radicals $CO_2^-$ are formed as intermediate composition. These radicals are neutralized and desorbed as $CO_2$. The adsorption of $CO_2$ molecules and the surface coating of $CO_2$ is disregarded. It is obtained $$\frac{dN_o}{dt} = a_1 P_{o2}(N_o^x - N_o)^2 - b_1(N_o^-)^2 - a_2 P_{co}N_o^- + b_2 N_{co2}^- \quad (33a)$$

$$\frac{dN_{co2}}{dt} = a_2 P_{co}N_o^- - b_2 N_{co2}^- - cN_{co2}^o \quad (33b)$$

$$g = cN_{co2}^o$$

Here $N_o^x$ is the surface concentration of adsorption centra of oxygen atoms. The first terms on the right side of (33a) and (33b) represent the number of $O_2$ and CO molecules, respectively, which are adsorbed per time unit and surface unit. Other terms convey the number of $O_2$ and CO molecules, respectively, which are desorbed per time and surface unit. It is assumed that the two atoms which recombine to an $O_2$ molecule are in electrically neutral condition. The last term of (33b) conveys the number of $CO_2$ molecules which are produced per time and surface unit and are transferred to the gas phase.

We assume that there is equilibrium at the surface and that the desorption rate of $O_2$ is much greater than the desorption rate of $CO_2$ which in turn is much greater than the desorption of CO molecules. Then it is obtained $$b_2 N_{co2}^- << cN_{co2}^o << b_1(N_o^-)^2 \quad (34)$$
and $$g = \frac{a_2 N_o^x P_{co} \eta^-}{1 + \eta^o\left(\frac{b_1}{a_1 P_{o2}}\right)^{\frac{1}{2}}} \quad (35)$$

$$g_o = \frac{a_2 N_o^x P_{co} \eta_o^-}{1 + \eta_o^o\left(\frac{b_1}{a_1 P_{o2}}\right)^{\frac{1}{2}}} \quad (36)$$

where we have introduced $\eta^-$ and $\eta_o^-$ according to previous definitions. If the second term of the denominator can be neglected in (20) (high $O_2$-pressure) it is obtained $$g = a_2 N_o^x P_{co} \eta^-$$

$$g_o = a_2 N_o^x P_{co} \eta_o^- \tag{37}$$

We see that under the presuppositions made, the reaction is an acceptor reaction. The acceptor character depends on the presupposition $$b_2 N_{co2}^- << C N_{co2}^o,$$

i.e. the adsorption of CO is rate determining.

Under the conditions above we obtain $$R = \eta^-/\eta_o^- - 1 \tag{38}$$

and $$R = \frac{\eta_o^o (\mu^- - 1)}{1 + \eta_o^- (\mu^- - 1)} \quad (\eta_o^+ = 0) \tag{39}$$

If the Fermi level is sufficiently far below the acceptor level so is $\eta_o^o \simeq 1$ and $\eta_o^o > > \eta_o^-$. Then $$R = \mu^- - 1 \tag{39}$$

with $$\mu^- = \exp\left[\frac{(\epsilon_v^- - V_s - v^-)}{kT}\right]$$

if we assume that the excitation is high. $v^-$ is farther below the conduction band before the chemisorbed oxygen atom.

Discussion of the Control Process

We revert to the discussion above of the thermal conditions and shall now discuss the control process. The conditions of ignition or extinction give $$Q \frac{dg}{dT} = \alpha \tag{6}$$

and the conditions of quasi-stationary situations $$\alpha = \frac{Q \cdot g}{T - T_o} \tag{7}$$

and $$g = \frac{c_o - c}{\tau}$$

If we assume that we can neglect the temperature dependence of $\tau$ when we substitute in (6) it is obtained $$\frac{1}{1-x} \frac{d}{dT}(1-x) = \frac{1}{T-T_o} \tag{40}$$

as the critical condition for instability.

In FIG. 9 the equation (40) is illustrated for oxidation of CO. It is illustrated therein how different values of $T_o$ provide different critical points and change the character of the critical conditions. If we move along the curve according to increasing temperature, we have (cfr. FIG. 10) a thermally quasi-stationary condition to ~210° C. and over ~215° C. Therebetween the condition is unstable according to FIG. 9. By changing $T_o$ we can affect the position of the quasi-stationary conditions. This can be advantageous from an exchange and selectivity point of view. The basic data in FIG. 10 have been produced by means of a mass spectrometer which has been constructed for measuring in one point. It has a low time constant ($\sim 10^{-3}$s) and measures the concentration a millimeter or so from the catalyst surface. This means that is is possible to measure (calculate) at every moment the quantities in equation (40) and to check the positions and criticality of the process. Necessary expressions are easily calculated by means of a minicomputer if relevant electrical impulses are transformed. By affecting $$\frac{1}{T - T_o}$$

and the curve form according to FIG. 9, it is accordingly also possible to control the process.

The importance of concentration/temperature derivative will be apparent from (40). This in turn results in dependence on geometrical conditions. The effect can easily be demonstrated by measuring on catalyst wires.

At ignition tests on explosive mixture, combustion only and no explosion occurs at certain volume and surface conditions.

By guidance of (6), (7), and (40) we form $$\frac{1}{g} \frac{dg}{dT}$$

for later discussion of thermal conditions. We will study how the thermal conditions are affected when the catalyst is exposed to ionizing radiation. By means of (40) we can experimentally control the reaction and the influence of external effects.

$$\frac{1}{g} \frac{dg}{dT}$$

is the analogous expression of the left side of (40).

We will study the oxidation of CO in the approach (37) and in order to refer to the earlier designations we introduce (see (37))

$$K = a_2 N_o^x RT \eta^- = \gamma \eta^- \tag{41}$$

where R is the general gas constant. $\gamma$ varies slowly with the temperature compared to an exponential function. $\eta^-$ is given in (30) for ionizing radiation.

We obtain in our approach with reactions of the first order $$\frac{1}{g} \frac{dg}{dT} = \frac{\beta}{k(\beta + k)} \frac{dk}{dT} \tag{42}$$

and $$\frac{d\eta^-}{dT} = \frac{2V_s}{kT^2} \eta^- \left(1 + \frac{2 \sinh \frac{2V_s}{kT}}{\left(1 + 2\cosh \frac{2V_s}{kT}\right)}\right) \tag{43}$$

thus $$\frac{1}{g} \frac{dg}{dT} = \frac{\beta}{\beta + k} \cdot \left(1 + 2 \sinh \frac{2V_s}{kT}\right) \cdot \frac{2V_s}{kT^2} \tag{44}$$

By exposing the catalyst to ionizing radiation we can affect the band diffraction $V_s$ and thus the form of the function as demonstrated in (40). This means that we can affect the choice of thermal conditions because (44) is the left side of (40). In FIGS. 4 to 7 it has earlier been demonstrated how ion bombardment changes the condition of the chemical reactor.

In order to confer critical conditions with and without radiation we form $$\frac{1}{k} \frac{dk}{dT},$$

because this expression is included in the critical formula (see 42)

$$\frac{1}{k} \frac{dk}{dT} = \frac{1}{k_o(R+1)} \frac{dk_o(R+1)}{dT} = \frac{1}{k_o} \frac{dk_o}{dT} + \frac{1}{R+1} \frac{d(R+1)}{dT} \quad (45)$$

where the other term on the right side thus accounts for the addition from the radiation. A simple case which can serve as a demonstration is included in (39) with $$R = \mu^- - 1 \quad (39)$$

and
$$\mu^- = \exp \frac{\epsilon_V^- - V_s - v^-}{kT}$$

Then $\frac{1}{R+1} \frac{d(R+1)}{dT} =$ $$-\frac{\epsilon_V^- - V_s - v^-}{kT^2} = -\frac{2\epsilon_V^- - \epsilon_s^- - v^-}{kT^2}$$

If we study (42) for small k ($k << \beta$) it is only (45) that is controlling as far as the critical condition is concerned. Then $\epsilon_V^-$, $\epsilon_s^-$ and $v^-$ determine the character of the influence of the radiation and thus how doping of the semi-conductor affects the critical conditions when we have irradiation. A doping of acceptor character makes $$\frac{1}{R+1} \frac{d}{dT}(R+1)$$

more negative and a doping of donor character makes it more positive. If $\epsilon_s^-$ increases sufficiently while $\epsilon_V^-$ is maintained constant, the effect can change sign. If $\beta$ and k have arbitrary values, extreme values can appear in the critical conditions ((40), (42)) in a similar manner. Since molecules, atoms and ions in the gas can appear as inpurities at the surface and also dope the surface, the critical conditions can be changed when the radiation is maintained and it is possible to advance from higher to lower conditions, and vice versa. See the examples in FIGS. 4 to 7.

I claim:

1. A method for determining the properties of a catalyst with respect to the catalysis of a reaction involving at least one gaseous substance comprising the steps of:
   arranging an electrode comprising a catalyst material and another electrode, said electrodes being spaced apart from one another, in a gaseous atmosphere containing said gaseous substance;
   applying an electric field between said electrodes;
   measuring the positive or negative corona current arising between said electrodes; and
   measuring the reaction ratio of said gaseous substance, said measuring steps generating data indicative of the properties of said catalyst.

2. A method according to claim 1, characterized in that the electric field is applied between the catalyst and the electrode in a defined space and the gaseous atmosphere is maintained by flowing a gaseous substance through said space.

3. A method for determining the properties of a catalyst material useful in the surface reaction of a gaseous substance comprising the steps of:
   (a) arranging an electrode comprising said catalyst material and another electrode, said electrodes being spaced apart from one another, in a gaseous atmosphere containing said gaseous substance;
   (b) providing an electric field between said electrodes to create a positive or negative corona current, said corona current being controlled by said electric field;
   (c) measuring physical quantities, said measured physical quantities including at least one of:
      (a) intensity of the ionizing radiation associated with said corona current;
      (b) temperature of the gaseous substance;
      (c) surface temperature of the catalyst; and
      (d) temperature of the gaseous atmosphere; and
   (d) determining the properties of said catalyst material from said measured quantities according to a reaction-kinetic model containing at least the electron properties of said catalyst material, said electron properties being dependent on the corona current.

* * * * *